(12) United States Patent
Bremer et al.

(10) Patent No.: US 6,922,415 B1
(45) Date of Patent: Jul. 26, 2005

(54) APPARATUS AND METHOD FOR A NON-SYMMETRICAL HALF-DUPLEX DSL MODEM

(75) Inventors: Gordon Bremer, Clearwater, FL (US); Robert E. Scott, Largo, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/537,609

(22) Filed: Mar. 29, 2000

Related U.S. Application Data

(63) Continuation-in-part of application No. 09/032,671, filed on Feb. 27, 1998, now Pat. No. 6,580,785, and a continuation-in-part of application No. 09/031,226, filed on Feb. 26, 1998, now abandoned.
(60) Provisional application No. 60/128,064, filed on Apr. 7, 1999.

(51) Int. Cl.[7] .............................. H04L 12/42; H04J 3/16
(52) U.S. Cl. ...................................... 370/449; 370/470
(58) Field of Search ................................. 370/280–282, 370/294–395.1, 445, 521, 419, 449–470, 472, 474; 375/219, 222, 240, 220

(56) References Cited

U.S. PATENT DOCUMENTS

| | | | | |
|---|---|---|---|---|
| 5,355,368 A | * | 10/1994 | Dore et al. | 370/296 |
| 5,596,577 A | * | 1/1997 | Perreault et al. | 370/449 |
| 5,625,651 A | | 4/1997 | Cioffi | 375/354 |
| 5,898,666 A | * | 4/1999 | Fukuda | 370/280 |
| 5,912,895 A | * | 6/1999 | Terry et al. | 375/222 |
| 5,936,963 A | * | 8/1999 | Saussy | 370/466 |
| 6,014,371 A | * | 1/2000 | Betts | 370/286 |
| 6,081,530 A | | 6/2000 | Wiher et al. | 370/395 |
| 6,154,524 A | * | 11/2000 | Bremer | 379/10.03 |
| 6,246,695 B1 | | 6/2001 | Seazholtz et al. | 370/468 |
| 6,272,108 B1 | * | 8/2001 | Chapman | 370/242 |
| 6,477,595 B1 | * | 11/2002 | Cohen et al. | 379/93.14 |

OTHER PUBLICATIONS

Kraimeche, B.; Integration of VBR video and ABR data sources at a DSL–based access node; Oct. 11–13, 1999; pp. 568–573; IEEE Xplore Citation.

Nedev, Nedko; McLaughlin, Stephen; Laurenson, David; and Daley, Robert; ATM Cell Error Performance of xDSL under Impluse Noise; Jun. 11–14, 2001; pp. 1254–1258 vol. 4; IEEE Xplore Citation.

Samosir, Benny Henricus; PT TELKOM Results on Field Tests of Asymmetric Digital Subscriber Line—Lite Technology via ATM Networks; Apr. 22–25, 2001; pp. 227–230; IEEE Xplore Citation.

* cited by examiner

*Primary Examiner*—Andy Lee
(74) *Attorney, Agent, or Firm*—Thomas, Kayden, Horstemeyer & Risley, LLP

(57) ABSTRACT

A non-symmetrical half-duplex data communications apparatus and method provides for transmitting and receiving non-symmetrical half-duplex signals over a communications link. The non-symmetrical half-duplex data communications apparatus includes interface circuitry that is connectable to the communications link and modulation circuitry to transmit and receive the non-symmetrical half-duplex signals over the communications link. The modulation circuitry of the non-symmetrical half-duplex data communications apparatus includes the ability to transmit data signals with a transmission time that is different than the transmission time of receive signals. The modulation circuitry of the non-symmetrical half-duplex data communications apparatus also includes the ability to transmit data signals with a transmission data rate different than the transmission data rate of receive signals.

30 Claims, 11 Drawing Sheets

APPARATUS AND METHOD FOR A NON-SYMMETRICAL HALF-DUPLEX DSL MODEM

CLAIM OF PRIORITY AND CROSS REFERENCE TO RELATED APPLICATIONS

This application claims the benefit of U.S. Provisional Patent Application Ser. No. 60/128,064, filed on Apr. 7, 1999, and entitled "APPARATUS AND METHOD FOR A NON-SYMMETRICAL HALF-DUPLEX MULTIPOINT DSL MODEM," and also this application is a continuation-in-part of application entitled "APPARATUS AND METHOD FOR A MULTIPOINT DSL MODEM," Ser. No. 09/031,226 now abandoned filed Feb. 26, 1998, and application entitled "APPARATUS AND METHOD FOR SIMULTANEOUS MULTIPLE TELEPHONE TYPE SERVICE ON A SINGLE TELEPHONE LINE," Ser. No. 09/032,671, now U.S. Pat. No. 6,580,785 filed Feb. 27, 1998, all of the foregoing of which are now pending and are incorporated herein by reference.

BACKGROUND OF THE INVENTION

1. Field of the Invention

The present invention generally relates to an apparatus and method that enables one or more modems, connected at a premises to a single subscriber line, to simultaneously communicate data with a modem at the central office end of the subscriber line, using non-symmetrical half-duplex data transmissions. Non-symmetrical half-duplex data transmissions include half-duplex transmission on a subscriber line wherein the transmission time in one direction is different than the other direction and/or the transmission data rate in one direction is different than the other direction.

2. Background of Related Art

Data communication on a subscriber line is typically referred to as DSL (digital subscriber line) communication. Examples of DSL technologies are ADSL, RADSL, HDSL, VDSL, basic rate ISDN, etc. Currently, most DSL communication is full duplex. Full duplex DSL communication is usually achieved on a wire pair by either frequency division multiplex (FDM), echo canceling duplex (ECD), or time division duplexing (TDD).

In FDM, the physical layer transmissions in each direction of communication utilize separate frequency bands with a guard band between these two communication bands. A result is that FDM requires more than twice the channel bandwidth than that required for just one communication direction. An additional consequence of FDM is that FDM suffers increased channel loss and reduced performance in one direction.

In ECD, the physical layer transmissions in both directions of communication utilize echo canceling in the same frequency band used to separate transmit and receive signals. A result is that ECD is susceptible to non-linear distortion and other non-cancelable aspects of the transmitted signal with a consequence that ECD suffers decreased dynamic range and reduced performance in both directions of communication.

In TDD, the physical layer transmissions alternate in one direction, then the other direction, in pre-arranged, equal time periods. In TDD, both directions of communication utilize the same frequency band and do not require echo canceling, thus avoiding the above disadvantages of FDM and ECD. However, TDD suffers the disadvantage of the maximum data rate in each direction of transmission is one-half that achievable in only one direction. In FDM, ECD and TDD, the physical layer transmissions are decoupled from and independent of the higher communication layers.

A full duplex variation restricted to communicating Ethernet data and called "EtherLoop" (developed by Elastic Networks) uses FDM, but couples transmissions to only Ethernet messages. Generally, DSL communication in the prior art is point-to-point, in that there is a single operating DSL modem at each end of the subscriber line with no provision for multiple DSL modems to be able to operate at either end.

Some leased line voiceband modems in the prior art provide for a single central site modem which communicates with one or more remote modems: a concept referred to as "four-wire multipoint communications." An example of such a modem is one that complies with the industry standard ITU V.27bis. The communication channel to each remote modem is a four-wire connection and the modems are typically widely geographically dispersed over the public telephone network. It is important to note in the dial-line modem prior art, the central site modem transmission is controlled by an attached central site computer or data terminal, which uses non-data control signals. An example of non-data control signals are those prescribed in industry standard ITU V.24 CT105 to control the start and end of transmissions.

Similarly, some dial line voiceband modems in the prior art provide for a single central site modem which communicates with one or multiple remote modems, which is a concept referred to as "two-wire PSTN communications." The communication channel to each remote modem is a two-wire PSTN connection and the modems are typically, widely geographically dispersed over the public telephone network. The physical layer is half-duplex, and the data protocol is half duplex. The direction of transmission is determined external from the dial modem and modem transmissions are thus controlled externally by control signals, such as Request-to-Send or V.24 CT105.

Importantly, in both prior art voiceband modem cases discussed above, the central site modem and the remote modems are never at both ends of a single subscriber loop.

Another example is for remote transmission controlled by an attached remote computer or data terminal which also uses non-data control signals such as those described in industry standard ITU V.24 CT105 to control the start and end of transmissions. In the leased line prior art cases, the central site transmission is continuous and the remote transmission is controlled as in the dial line case. In both these cases, the attached computers or data terminals must ensure that transmissions do not overlap by monitoring the ends of received signals, for example via ITU V.24 CT109, and delaying CT105 accordingly.

It should be noted that, with respect to the prior art voiceband modem discussed above, communications for one or more remote users are not on the subscriber line and involve transmission controls from attached multiple computers or data terminals via non-data interfaces. It may be constructive to note that the dial modem techniques are not efficient for use on a subscriber line where much higher data rates and faster turnaround times are demanded.

Another prior art technology is Ethernet local area network communication wherein the physical channel can be a short two-wire channel, never a general subscriber line. Here, transmissions are derived directly from the upper layer data protocol, but there is no central control, and therefore, the signals may collide. A special upper layer protocol must manage the detrimental effects of collisions. It may also be constructive to note that the Ethernet techniques cannot be efficiently applied to subscriber loops because of collisions and the ability to span the distances incurred on a loop.

Another aspect in the prior art is that the Point-to-Point Protocol (PPP) defined in Internet Engineering Task Force (IETF) specification Request for Comment (RFC) 1661 is defined to operate as follows: "The Point-to-Point Protocol is designed for simple links which transport packets between two peers. These links provide full-duplex simultaneous bi-directional operation." Up to this time, the Point-to-Point Protocol has not been used in connection with half-duplex links.

Heretofore, modems have lacked the ability to conduct half-duplex transmission on a subscriber line wherein the transmission time in one direction is different than the other direction and/or the transmission data rate in one direction is different than the other direction.

SUMMARY OF THE INVENTION

The present invention provides an apparatus and method for providing non-symmetrical half-duplex data communications. Briefly described, in architecture, the apparatus can be implemented as follows. The non-symmetrical half-duplex data communications apparatus includes interface circuitry connectable to a communications link and modulation circuitry that provides the ability to transmit and receive non-symmetrical half-duplex signals over the communications link. The modulation circuitry provides the ability to transmit signals with a transmission time and/or transmission data rate, that is different than the transmission time and/or transmission data rate of receive signals.

The present invention can also be viewed as providing a method for providing non-symmetrical half-duplex data communication. In this regard, the method can be broadly summarized by the following steps: (1) providing a communications link for transmitting and receiving half-duplex signals; and (2) transmitting a half-duplex signal over said communications link with a transmission time and/or transmission data rate, that is different than the transmission time and/or transmission data rate of receive signals.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 8A is a schematic diagram showing a poll with no central office user data, followed by a response with no premises user data.

FIG. 8B is a schematic diagram showing a poll with central office user data, followed by a response with no premises user data.

FIG. 8C is a schematic diagram showing a poll with no central office user data, followed by a response with premises user data.

FIG. 8D is a schematic diagram showing a poll with central office user data, followed by a response with premises user data.

DETAILED DESCRIPTION OF THE PREFERRED EMBODIMENT

In the descriptions of the present invention that follow, the terminology "DTU-R" refers to data terminal unit-residence which is a DSL transceiver or modem located typically at a residence or small business. The terminology "DTU-C" refers to data terminal unit-central office, which is a DSL transceiver or modem located typically at a telephone central office, at a telephone digital loop carrier site, or at a functionally similar location on a campus.

The present invention is generally directed to a non-symmetrical half-duplex data communications apparatus and method that are implemented via logic to perform selected program routine sequences. These sequences include the transmission of packets or cells from one or multiple DSL modems directly connected, at a premises, to a single subscriber line to simultaneously provide data sessions with a single DSL modem at the other end of the subscriber line.

The non-symmetrical half-duplex data communications apparatus and method of the present invention creates the appearance to the data terminal unit at the user residence that full duplex communication is being achieved. The appearance of full duplex communication is achieved so that the data rate and performance in each direction can equal the full data rate capacity and full performance potential of the subscriber line itself at moments when no other user data communication is in progress. At times when user data communication in both directions is required at the same time, the present invention creates the appearance that the full data rate capacity of the subscriber line is shared.

The non-symmetrical half-duplex data communications apparatus and method of the present invention achieves the above desirable attributes without requiring the excessively high channel bandwidth utilization of FDM or the reduced performance of ECD. The non-symmetrical half-duplex data communications apparatus and method also can achieve twice the data rate in each direction of transmission than that of TDD. The non-symmetrical half-duplex data communications apparatus and method furthermore achieves these attributes without control by an external computer or data terminal. The non-symmetrical half-duplex data communications apparatus and method achieves twice the data rate in each direction of transmission than that of TDD by using Adaptive Time Domain Duplexing (ATDD). ATDD is an improvement upon TDD, where the 50% duty cycle of TDD is replaced by a duty cycle that adaptively and near-instantaneously is varied from near 0% to near 100% based on protocol responsive to the user data communication needs in each direction of transmission.

Figure 1:
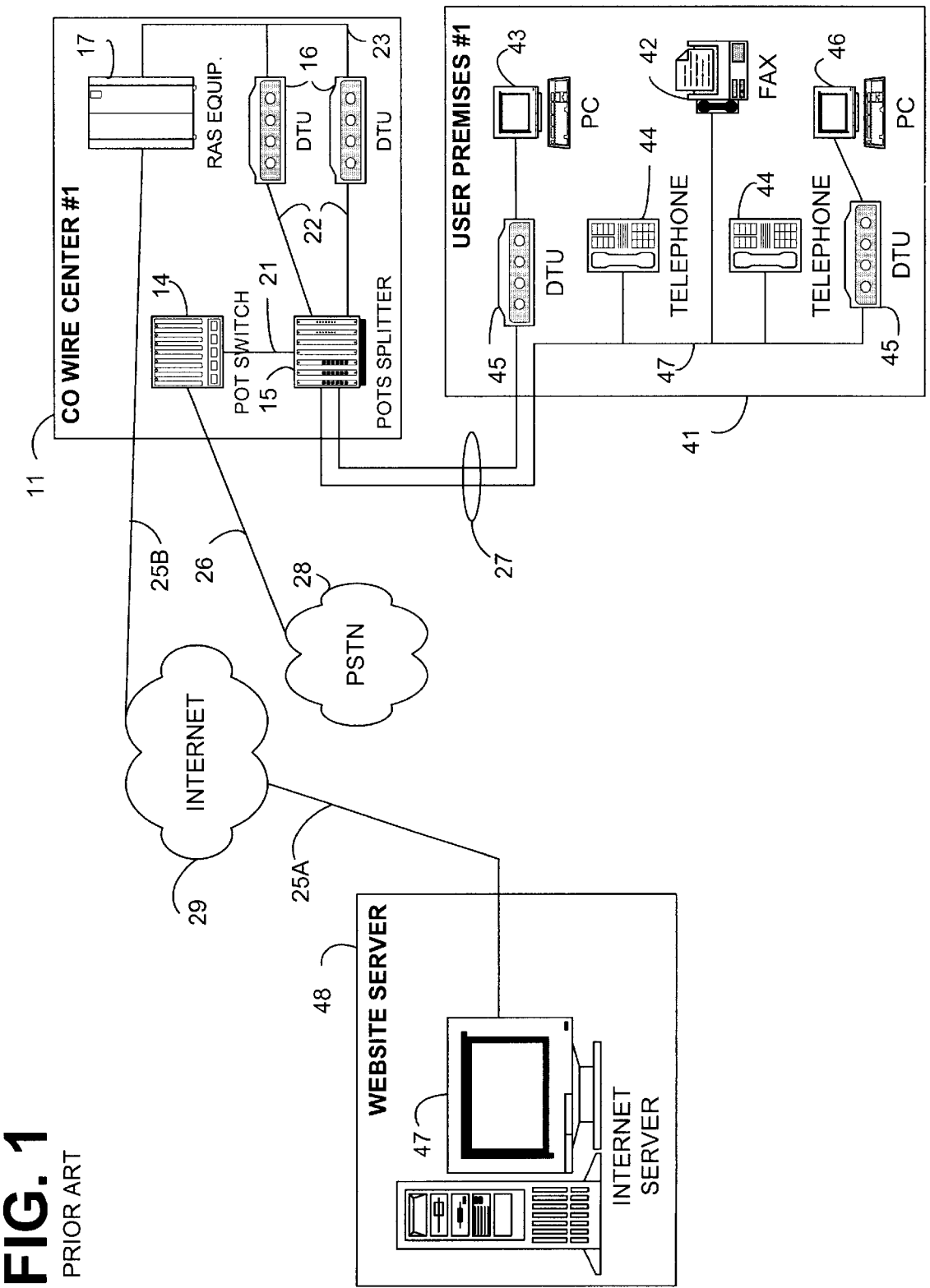
FIG. 1 is a view of the central office (CO) wire centers and user premises layout of the prior art.

FIG. 1 illustrates the plain old telephone system (POTS) network with DTU-Cs 16 and DTU-Rs 45 of the prior art. The POTS network includes user premises 41 connected to a central office wire center 11 via a subscriber line 27. Each subscriber line 27 is connected to the user premises 41, which further connects to a user premises line 47, for distribution of POTS service and DSL service throughout the user premises. There is a DTU-R 45 connected to each premises line 47. Usually, there are numerous POTS devices connected to each user premises line 47, such as telephones 44, facsimile (fax) machines 42, and the like. Prior art baseband DSLs typically cannot operate with POTS devices, in which case all of the POTS entities of FIG. 1 are absent.

It is noted that POTS splitters can be utilized at the premises, when required, to separate the POTS lower frequency band, which is between about 0 kHz and about 4 kHz, from the DSL signals, which are at a higher frequency level than the POTS frequency band. In applications where the premises POTS splitter is required, the splitter would be on the incoming subscriber line 27, with the DTU-R 45 coming off one splitter line and the two phones 44 and fax 42 off the other.

As noted previously, each user premises is connected via a subscriber line 27 to a central office wire center 11. The subscriber line 27 is connected to a POTS splitter device that separates the analog POTS signals from data signals. The POTS signals are sent to a POTS switch 14 that is connected to the other central office wire centers, via the public switched telephone network (PSTN) 28 over connection 26. DTU data signals are separated from the POTS analog signals at POTS splitter 15 and are connected to DTU-Cs 16 within the central office wire center 11. DTU-Cs 16 are further connected to digital data networks such as the Internet 29 through a remote access server (RAS) 17.

A brief discussion will now be provided of an example of the signals that are generated in accordance with the applied system environment of the prior art at the user premises and transmitted through the central office wire center, via either the PSTN or Internet networks, and back to a user premises.

When a user desires to place a telephone call on device 44, the user picks up the telephone and puts the subscriber line 27 in an off-hook condition that is detected at the central office wire center 11 by closed switch hooks (not shown). The off-hook condition signals the central office wire center 11, via subscriber line 27, to accept an outgoing call by allowing a flow of D.C. current and a dial tone of 480 Hz to be sent to device 44. The outgoing telephone call signals are transmitted, as described before, via subscriber line 27 to POTS splitter 15. The analog POTS system signals are separated from the DSL modem signals, and the POTS signals are directed towards the POTS switch 14 for transmission, via the PSTN network 28, to another telephone (not shown).

A description of digital signals transmitted to/from the user premises will now be provided. When a user desires to transmit data over a digital network via his personal PC 46 or the like, the digital signals from the digital device are transformed into full duplex analog signals, via modulation by DTU-R 45. The signals are transmitted over the user premises line 47 to the subscriber line 27 for final delivery to the local central office wire center 11. The digitally modulated analog signals going into POTS splitter 15 are separated from the analog POTS signals, and are directed to DTU-Cs 16. DTU-Cs 16 demodulate the analog signals back to their original digital data signals. DTU-Cs 16 transmit the digital data over the Internet 29 via the RAS 17. The digital data signals sent over the Internet 29 are typically received by an internet server 47, which returns information to the user.

As discussed above with respect to the prior art, it is necessary to have multiple subscriber lines 27 connected to user premises to be able to have multiple DTU-Rs 45 at the same premises simultaneously communicating data with the central office.

Figure 2:
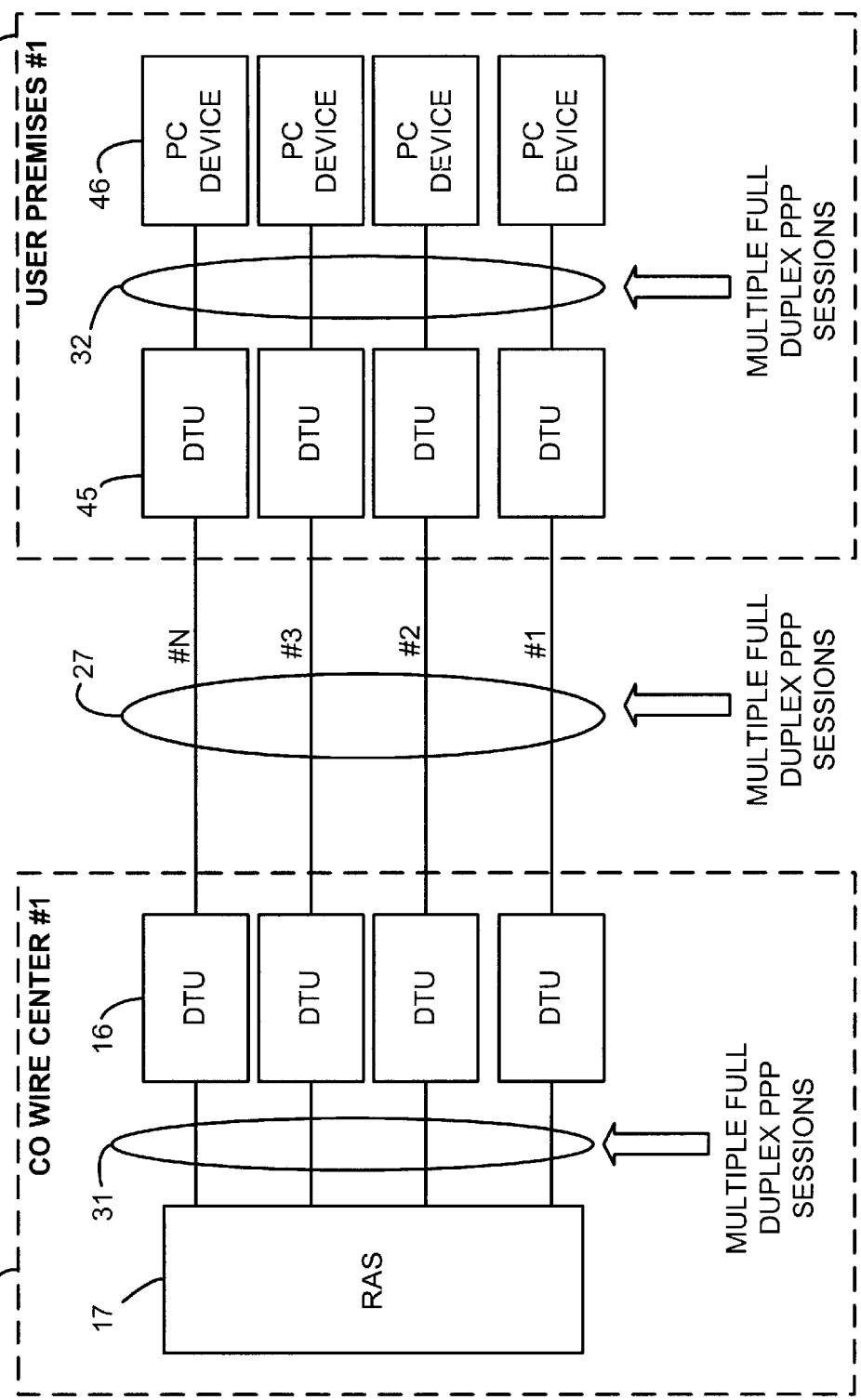
FIG. 2 is a block diagram of the connections between the central office wire center and residence data terminal unit at the user premises as shown in FIG. 1.

FIG. 2 illustrates the CO wire center DTU-C and DTU-R connections used in the prior art which include multiple subscriber lines 27. These multiple subscriber lines 27 are connected to a user premises to enable multiple full duplex DTU-Rs 45 to simultaneously communicate data with the central office 11.

Also illustrated in FIG. 2 is the type of communication traffic occurring. In the CO wire center 11, communication between remote access server (RAS) 17 and each individual DTU-C 16 occurs with multiple full duplex Point to Point Protocol (PPP) sessions over interface lines 31. The input and output from each DTU-C 16 on subscriber lines 27 to and from each DTU-R 45 occurs using multiple full duplex PPP sessions. Furthermore, communication between DTU-Rs 45 and digital type devices, such as a PC 46, occur utilizing multiple full duplex PPP sessions over interface lines 32.

Figure 3:
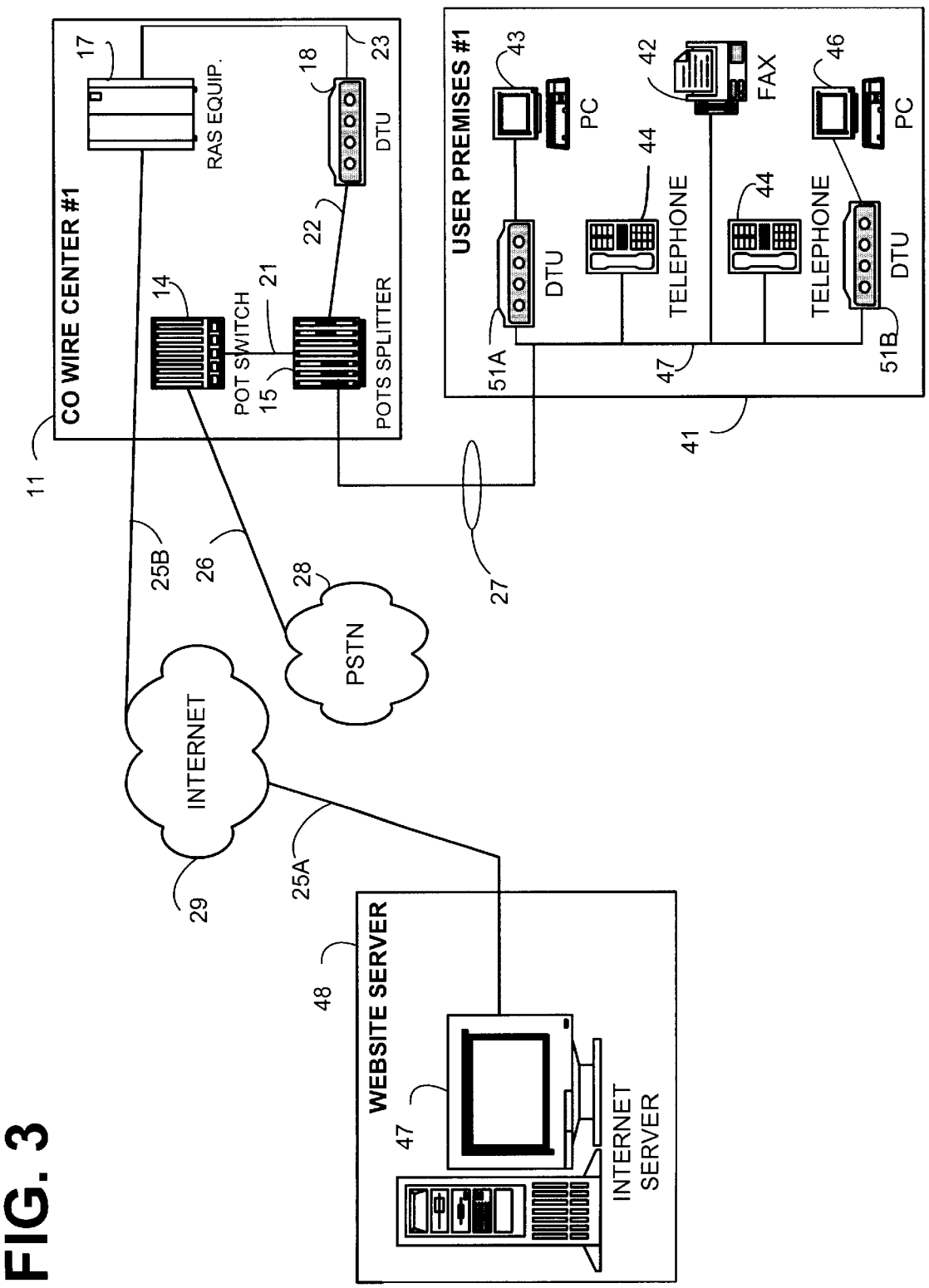
FIG. 3 is a view of the CO wire centers and user premises layout of the present invention.

FIG. 3 illustrates the CO wire centers and user premises layout in accordance with the present invention, which enables one or more DTU-Rs 51, connected at a premises 41 to a single subscriber line 27, to simultaneously communicate data with a single DTU-C 18 at the central office 11 end of the subscriber line 27. Note specifically that the figures suggest that DTU-C data is sent to a single DTU-R at one premises, but the present invention also applies to a DTU-R that can support one or more users at a single premises and one or more users at one or more premises.

Figure 4:
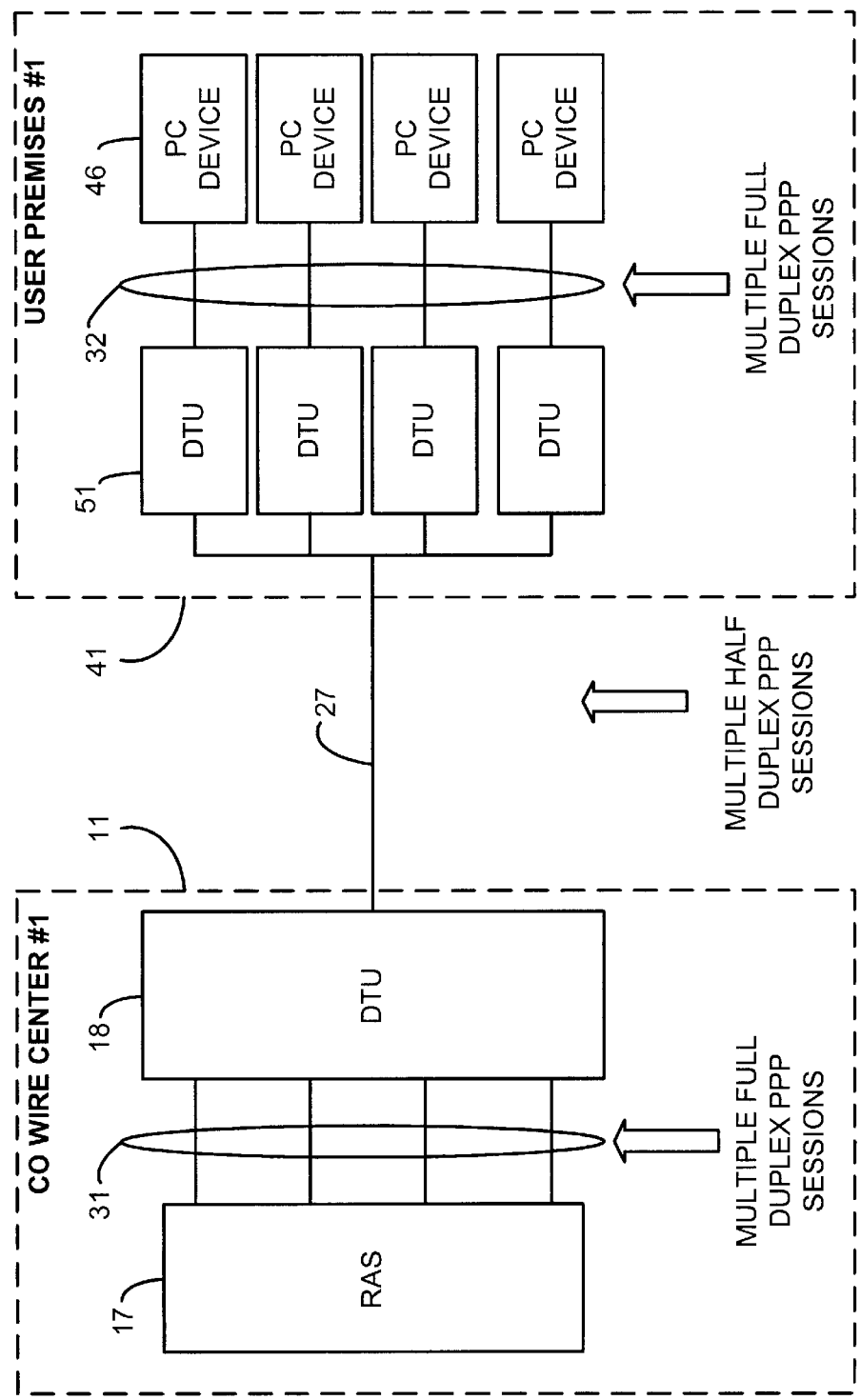
FIG. 4 is a block diagram of the connections between the central office wire center and residence data terminal units at the user premises as shown in FIG. 3.

FIG. 4 illustrates one example of the CO wire center connections to the DTU-R. These connections can enable one or more DTU-Rs 51 to be connected to one or more personal computers (PC) 46 and/or other digital type devices located at premises 41. These multiple connections can be connected to a single subscriber line 27, to simultaneously communicate data with a single DTU-C 18 at the central office 11 end of the subscriber line 27.

As also illustrated in FIG. 4, the communication between RAS 17 and the single DTU-C 18 occurs utilizing one or more full duplex PPP sessions over interface lines 31. Communication between the single DTU-C 18 and the one or more DTU-Rs 51 at the user premises across the single subscriber line 27 occurs utilizing one or more half duplex PPP sessions. These half-duplex sessions utilize point-to-point full duplex data protocols, for example, but not limited to, the Point to Point Protocol (PPP) defined in Internet Engineering Task Force (IETF) specification Request for Comment (RFC) 1661. The communications between the DTU-R 51 and the user premises digital device 46 occur utilizing one or more full duplex PPP sessions over interface lines 32.

Figure 5:
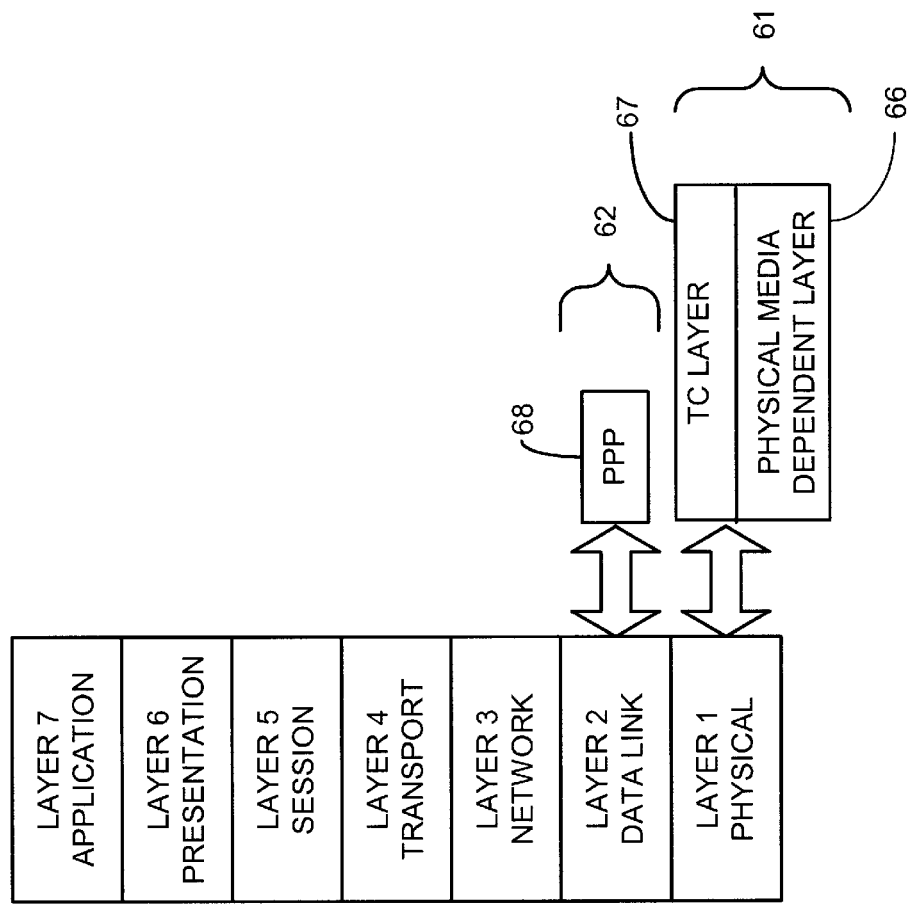
FIG. 5 is a block diagram of the OSI layers of the present invention.

Illustrated in FIG. 5 is the OSI 7-layer model, including information relating to the physical and data link layers in accordance with the present invention. As shown in FIG. 5, the Physical Layer 61 contains two distinct sub-layers, the Transmission Convergence (TC) Sublayer 67 and the Physical Media Dependent (PMD) Sublayer 66. The PMD 66 deals with the aspects that are dependent on the transmission medium selected, i.e., the subscriber line.

The PMD 66 specifies the physical medium and the transmission characteristics (e.g., bit timing, line coding). However, PMD 66 does not include framing or overhead information.

The TC layer 67 deals with the physical layer aspects, which are independent of the transmission medium characteristics. Most of the functions comprising the TC layer 67 are involved with the generation and processing of some overhead information contained within the frame.

The Data Link Layer 62 uses Point to Point Protocol (PPP) 68. The invention described herein specifies techniques that enable PPP to operate half-duplex over the subscriber line 27. One DTU-C 18 can service one or more DTU-Rs 51, with each DTU-R 51 appearing to receive a unique PPP session. An alternative embodiment utilizes asynchronous transfer mode (ATM) cells as a link layer protocol.

Figure 6A:
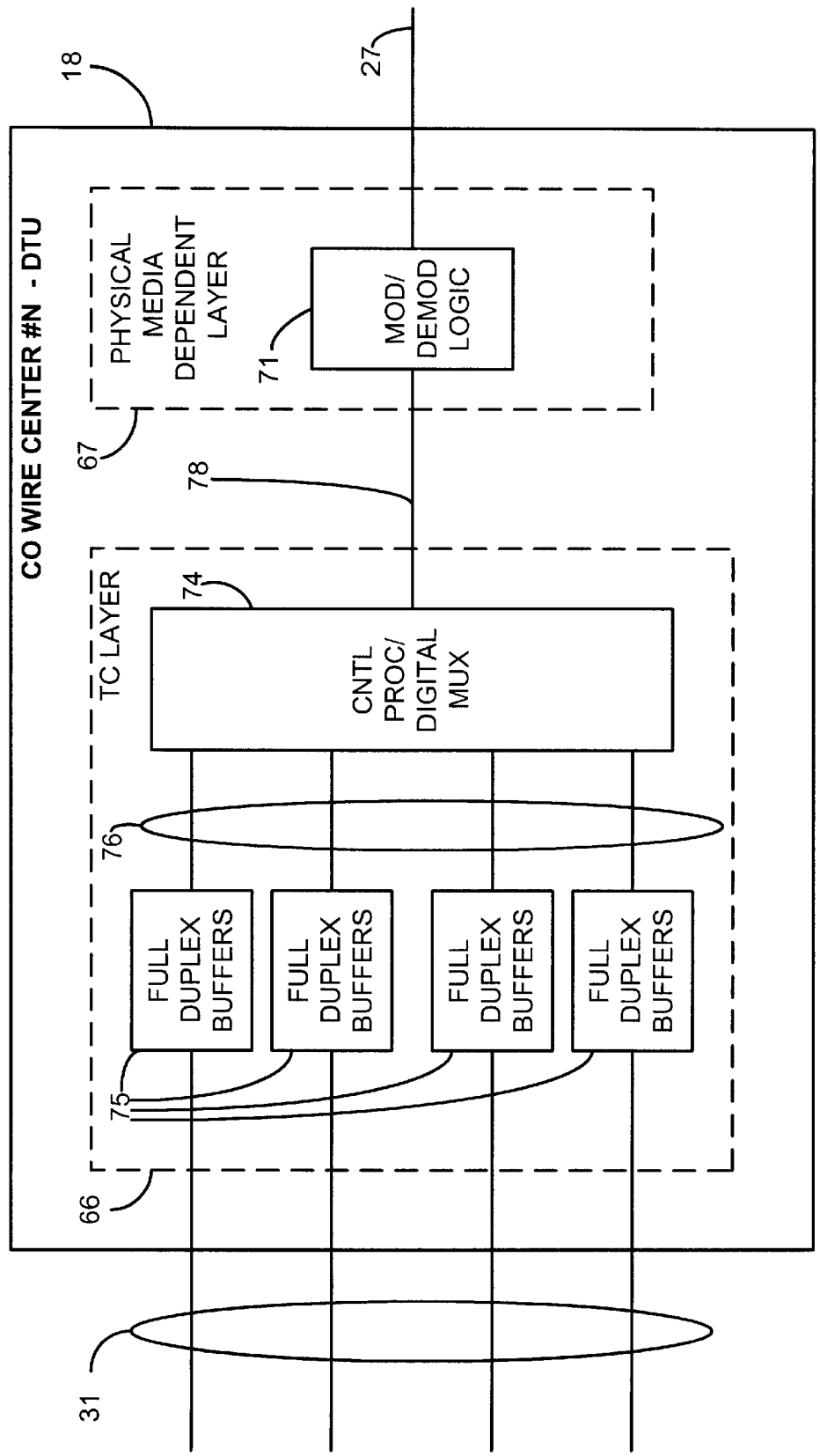
FIG. 6A is a block diagram of an example of the transmission convergence and physical media dependent functions of the data terminal unit at the central office.

FIG. 6A is a block diagram of an example of a CO wire center multichannel data communications device DTU-C 18 constructed in accordance with the present invention. The typical configuration of the multichannel data communication device DTU-C 18 at the central office wire center 11, has the multichannel data communication device DTU-C 18 connected, via a POTS splitter 15 (FIG. 3), to the subscriber lines 27. In FIG. 6A, one or more full duplex PPP sessions are transported over interface lines 31 to the Full Duplex Buffers 75. The full duplex buffers 75 include circuitry to convert serial data streams into parallel data. Each full duplex PPP session is carried over a separate interface line 31. Upon detection of a PPP frame in any of the full duplex buffers 75, the control processor/digital multiplexer 74 will encapsulate this PPP frame, as described below with respect to FIGS. 7A and 7B, and send it to the modulator/demodulator 71 via line 78. The modulator/demodulator 71 will modulate and transmit this frame onto the subscriber line 27 to far end subscriber DTU-R 51.

An alternative embodiment has the data communication device DTU-C 18 connected, via a POTS splitter 15 (FIG. 3), to a single subscriber line 27. In this case, one full duplex PPP session is conducted over interface line 31 to the Full Duplex Buffer 75. Upon detection of a multipoint DSL frame (i.e. a PPP frame) in the full duplex buffer 75, the control processor/digital multiplexer 74 will encapsulate this multipoint DSL frame (i.e. a PPP frame), and send it to the modulator/demodulator 71 via line 78. These multipoint DSL frames (i.e. a PPP frames) 91 and 96, are described below with respect to FIG. 7A and FIG. 7B. The modulator/demodulator 71 will modulate and transmit this frame onto the subscriber line 27 to a single far end subscriber DTU-R 51.

Figure 6B:
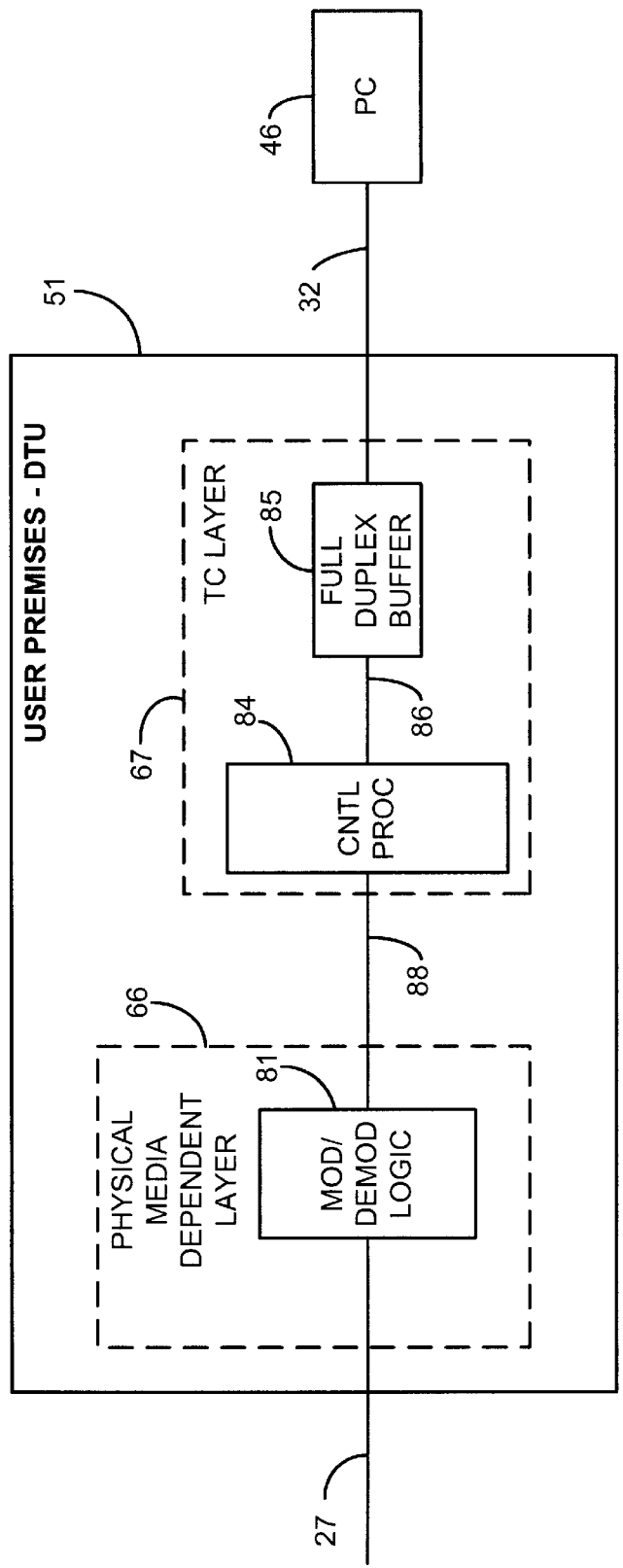
FIG. 6B is a block diagram of the transmission convergence and physical media dependent layers of the residence data terminal unit of the present invention.
Figure 7A:
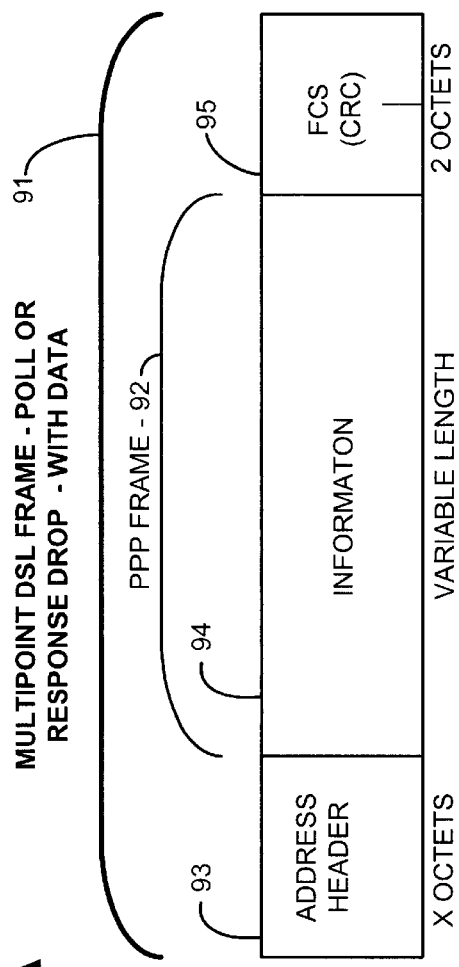
FIG. 7A is a block diagram of the multipoint-capable DSL poll or response frame with data.
Figure 7B:
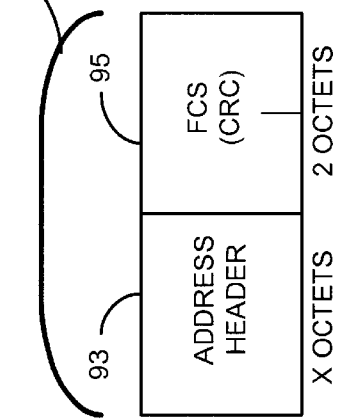
FIG. 7B is a block diagram of the multipoint DSL poll or response frame without data.

FIG. 6B is a block diagram of the DTU-R 51 constructed in accordance with the present invention. DTU-R 51 will demodulate the signal transmitted by DTU-C 18 over subscriber line 27 using modulator/demodulator logic 81. The demodulated data is sent to control processor 84 via line 88. Control processor 84 will check for errors by analyzing the FCS octets 95 (FIGS. 7A and 7B). If no errors exist, then control processor 84 will determine if this poll is meant for it by utilizing the address header 93 (FIGS. 7A and 7B) in the multipoint DSL frame 91 or 96 (FIGS. 7A and 7B). These multipoint DSL frames 91 and 96, are described below with respect to FIG. 7A and FIG. 7B. If the address header 93 (FIGS. 7A and 7B) indicates that this communication is intended for this DTU, the control processor 84 will check for a PPP frame 92 (FIG. 7A). If this PPP frame 92 (FIG. 7A) exists, this PPP frame 92 will be placed into full duplex buffer 85 via line 86. The full duplex buffer 85 will transfer this PPP frame 92 (FIG. 7A) to PC 46 via line 32.

Since the PPP session on line 32 operates in full duplex mode, the PC 46 can at any time transfer a PPP frame 92 (FIG. 7A) into full duplex buffer 85 via line 32. After receiving a poll on subscriber line 27, DTU-R 51 knows that it is its turn to communicate information. If a PPP frame 92 (FIG. 7A) exists in the full duplex buffer 85, the PPP frame 92 is encapsulated into a multipoint DSL frame 91 (FIG. 7A) by control processor 84, and sent to modulator/demodulator 81 for modulation onto the subscriber line 27. If no PPP frames 92 are available to send, the control processor 84 will send a signal indicative of no data multipoint DSL frame 96 to modulator/demodulator logic (modem) 81. Modulator/demodulator logic 81 will transfer this response to subscriber line 27.

FIG. 7A illustrates the method of the present invention that the DTU-C 18 uses to address the various DTU-Rs 51. The control processor/digital mutiplexer 74 (FIG. 6A) creates a multipoint DSL frame 91 by using TC layer circuitry 66 (FIG. 6A) to encapsulate the PPP frame 92. This TC layer circuitry 66 includes control processor/digital mutiplexer 74 circuitry that generates an address header 93 and a frame check sequence (FCS) 95. The control processor/digital mutiplexer 74 looks to the source line 31 and determines the appropriate address header 93 for the destination device. The address header 93 includes information that indicates to one of the plurality of endpoints that multipoint DSL frame 91 is meant for it. The FCS 95 octets assure that the entire multipoint DSL frame 91 is correct.

The apparatus and method of the present invention utilized for generating the address header 93 and the frame check sequence 95 are described in commonly assigned and co-pending U.S. Patent Application entitled, "SYSTEM AND METHOD FOR DYNAMIC ALLOCATION OF LINK LAYER ADDRESSES IN A MULTI-POINT PROTOCOL INCLUDING VARIABLE BACK OFF TIMING," Ser. No. 09/026,605 filed on, Feb. 20, 1998 now abandoned, herein incorporated by reference. The TC layer utilized in the preferred embodiment of the present invention is also referred to as the "data link line layer" in the above-incorporated U.S. Patent Application.

FIG. 7B shows the case where either the DTU-C 18 (FIG. 6A) or remote DTU-R 51 (FIG. 6B) has no data to send. The address header 93 and FCS 95 octets are still included, but no PPP information is sent. No data multipoint DSL frame 96 is used for cases where the subscriber DSL modem 51 has no PPP data to send in a response. It can also be used by DTU-C 18 to poll a subscriber DTU-R 51 for PPP information, even though DTU-C 18 has no PPP frames to send.

Illustrated in FIGS. 8A through 8D are schematic diagrams demonstrating the polling algorithms that allow modulator/demodulator logic 71 and 81 to simultaneously support one or more premises. In the simple case, two DTUs exist on the line 27, namely, the DTU-C 18 and the user premises DTU-R 51. However, those skilled in the art will recognize that poll/response modulation can allow one or more user premises DTU-Rs 51 to exist on the same local loop.

The modulation used in the preferred embodiment of the non-symmetrical half-duplex data communications apparatus and method is referred to herein as "adaptive time division duplexing" (ATDD), whereby the transmission on a single subscriber loop can only occur in one direction at a time. The specific version of ATDD is a poll/response modulation, whereby the DTU-C 18 controls which of the premises multiple DTU-Rs 51 on the subscriber line 27 is allowed to transmit. A "poll" is a transmission from the DTUC 18, while a "response" is a transmission from a user premises DTU-R 51. To avoid simultaneous transmissions on the line, a poll will usually occur followed normally by a response. For cases in which a response has no data, "silence" is a legitimate response. DTU-C 18 will recognize this as a response with no data.

The start of a poll or a response is indicated by the PMD layer 66 (FIG. 5) turning on the carrier. The end of a poll or a response is indicated by the PMD layer 66 (FIG. 5) turning off the carrier. As shown in FIGS. 7A and 7B, the multipoint DSL frames 91 and 96 do not need flag delimiters, as are normally found in PPP frames. Instead, the turning on and off of the carrier indicates the start and the stop, respectively, of a PPP frame. The method used to accomplish the PMD layer is described in commonly assigned U.S. Pat. No. 4,669,090, issued May 26, 1987, entitled "Half-Duplex Modem Without Turnaround Delay," herein incorporated by reference, and in commonly assigned U.S. Pat. No. 4,744,092, issued May 10, 1988, entitled "Transparent Error Detection In Half Duplex Modems," herein incorporated by reference.

The method used to accomplish the PMD layer is also described in commonly assigned and co-pending U.S. Patent Application entitled "Circular Constellations For Uncoded Modulation," Ser. No. 08/915,980 filed on Aug. 21, 1997, now U.S. Pat. No. 6,026,120 herein incorporated by reference, and U.S. Patent Application entitled "SYSTEM AND METHOD FOR TRANSMITTING SPECIAL MARKER SYMBOLS," Ser. No. 08/ 979,455, filed on Nov. 26, 1997, now U.S. Pat. No. 6,137,829 herein incorporated by reference.

FIGS. 8A through 8D are schematic diagrams demonstrating the four respective modes for the poll/response cycle.

Figure 8A:
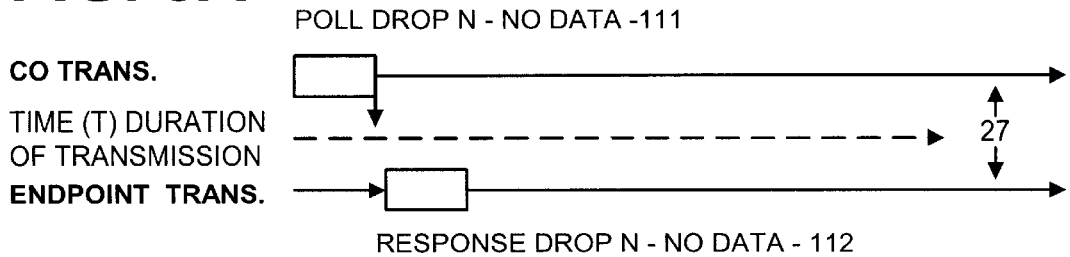
FIGS. 8A to 8D are schematic diagrams showing the modes of poll and response transmissions that are placed on the local loop by the DSP logic in FIGS. 6A and 6B, and that the transmission time on the local loop in one direction can be vastly different than the transmission time in the opposite direction; more particularly.

Illustrated in FIG. 8A demonstrates a poll with no user data step 111. The poll with no user data step 111 is followed by a response with no user data step 112.

Figure 8B:
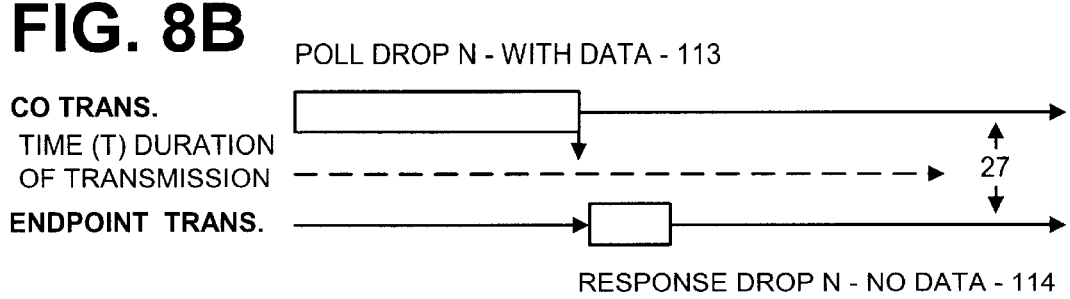

Illustrated in FIG. 8B demonstrates a poll with user data at step 113. The poll with user data step 113 is followed by a response with no user data at step 114.

Figure 8C:
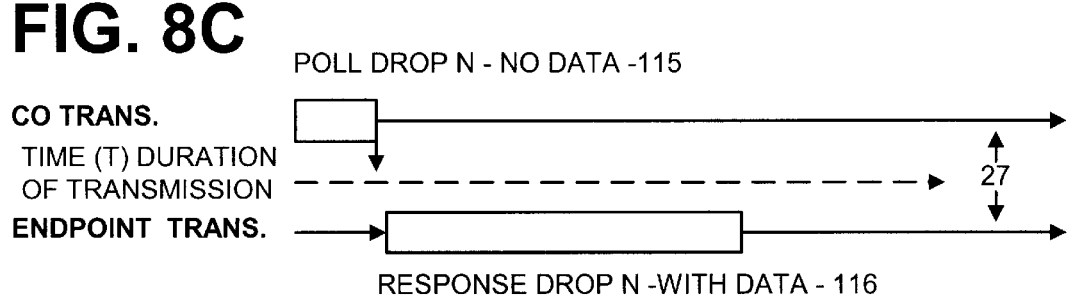

Illustrated in FIG. 8C demonstrates a poll with no user data at step 115. The poll with no user data step 115 is followed by a response with user data at step 116.

Figure 8D:
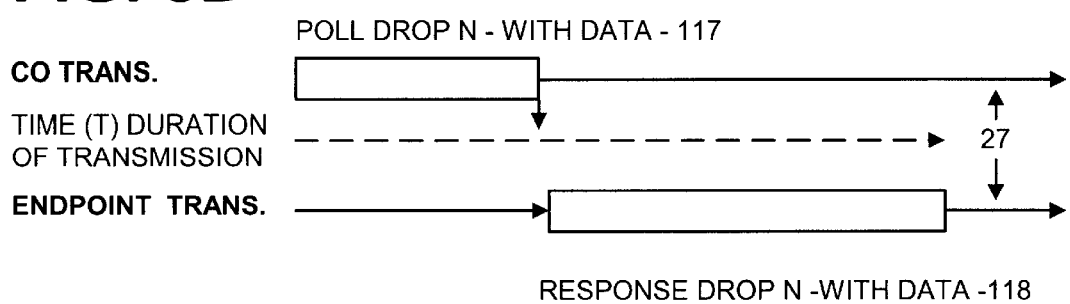

Illustrated in FIG. 8D demonstrates a poll with user data at step 117. The poll with user data step 117 is followed by a response with user data at step 118.

Also demonstrated in FIGS. 8A–8D is that the transmission time in one direction can be vastly different than the transmission time in the opposite direction. Specifically, as seen in FIG. 8B, the transmission time of the poll drop n-with data 113 is greater in time than the response drop n-no data 114. This is also illustrated in FIGS. 8C and 8D where the poll drop n 115 and 117, respectively, is different-in size than the response drop n-116 and 118, respectively. This illustrates the non-symmetrical half duplex capability of the present invention.

Figure 9:
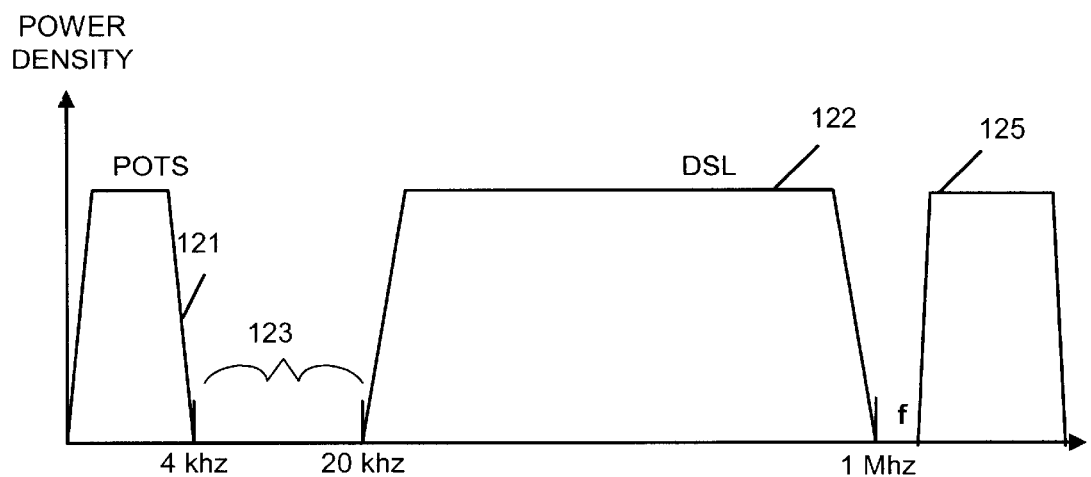
FIG. 9 is a graph showing the frequency spectrum of the data terminal unit and the POTS channel, as shown in FIG. 3, when any POTS device is "off-hook."

FIG. 9 is a diagram illustrating frequency band communications of DUT-C 18 and DUT-R 51. The terminology "frequency band communications" is used here to indicate communication of information within a certain defined, frequency band. As is known in the prior art, POTS communications are transmitted in the frequency band 121 defined between about 0 Hz (DC) and about 4 kHz. A second transmission frequency band 122 is defined at a higher frequency level than the POTS frequency band 121 and is used in the transmission of digital subscriber line (DSL) communications. A guard band 123 is used to separate the two transmission frequency bands 121 and 122.

The DSL transmission frequency band 122 is more broadly denominated as "xDSL," wherein the "x" generically denominates any of a number of transmission techniques within the DSL family. For example, ADSL—asymmetric digital subscriber line, RADSL—rate adaptive digital subscriber line, HDSL—high-bit-rate DSL, VDSL-very-high-bit-rate DSL, etc. As is known, xDSL transmission frequency bands may encompass a bandwidth of greater than about 1 MHz. As a result, and for the reasons described above, without the addition of extra equipment, such as POTS filters, splitters, etc., the xDSL signals are not compatible with attached POTS type equipment, such as telephones, PSTN modems, facsimile machines, etc.

As an example, basic rate ISDN operates in the band below 100 kHz. ADSL downstream operates only above 138 kHz. Similarly, VDSL or in-home LANs can operate at yet much higher bands. A third transmission frequency band 125 is illustrated at a higher frequency level than both the POTS frequency band 121, and the second transmission frequency band 122. This third transmission frequency band 125 can be used for the transmission VDSL communications without regard to any other activity in the POTS frequency band 121 or the DSL second transmission frequency band.

As will be discussed in more detail below, an alternative embodiment of the present invention provides an upper transmission band having an upper frequency boundary that is much lower than the 1 MHz frequency boundary often encountered in xDSL transmissions. Indeed, the upper frequency boundary of the present invention may be defined in a range that is readily supported by, or compatible with, transmission systems (and attached POTS-type equipment) presently in place between a customer premises and a central office, without the need for extraneous devices such as POTS filters and POTS splitters, as will be understood by those skilled in the art.

In accordance with one aspect of the invention, a multi-channel data communication device, namely, DSL modem 51, is provided for achieving efficient data communications between a customer premises 41 and a central office 11 across a local loop 27 by dynamically allocating a transmission frequency bandwidth for transmitting data. Certainly, one of the factors motivating the development of the present invention is the expanded demand for higher speed communications in recent years. This enhanced demand is primarily attributed to communications over the Internet.

The present invention may utilize dynamic allocation of the data transmission frequency band in response to POTS communications activity across the same line as described in commonly assigned and co-pending U.S. Patent Application entitled, "Digital Subscriber Loop Data Communications Method Enabling Simultaneous Data And POTS Without POTS Filters/Splitters Or Special Premises Wiring," Ser. No. 08/962,796, filed on Nov. 3, 1997, now U.S. Pat. No. 6,061,392 herein incorporated by reference.

Figure 10:
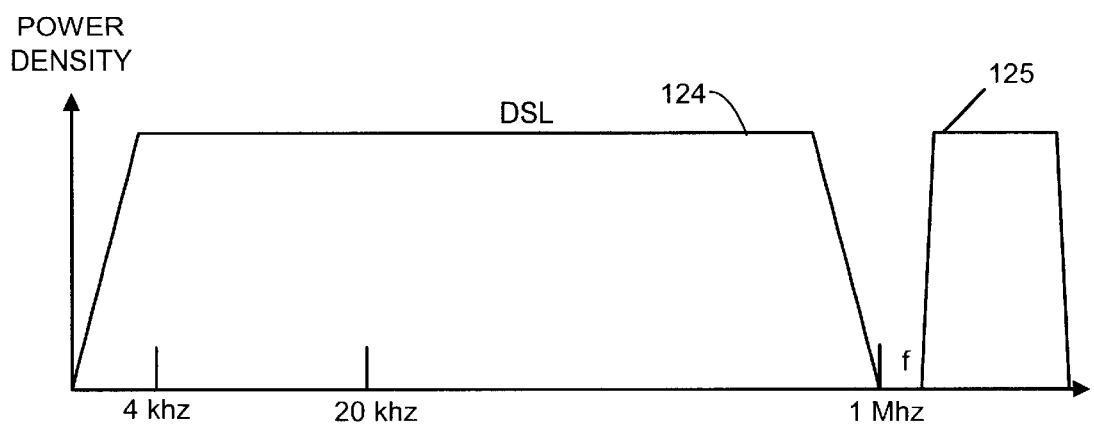
FIG. 10 is a graph showing the frequency spectrum of the data terminal unit and the POTS channel, as shown in FIG. 3, when all POTS devices are "on-hook."

As illustrated in FIG. 10, the non-symmetrical half-duplex data communications apparatus and method of the present invention may utilize the transmission frequency band 124 for the data communications at times when there is no present demand for transmitting voice information. That means that the data transmission frequency band spectrum 122 (FIG. 9) can extend to 0 kHz as in the data transmission frequency band 124. When there is a demand for voice transmissions, then the present invention reallocates the transmission frequency band 124 for the data communications, so that the data transmission frequency band spectrum 122 (FIG. 9) causes no overlap or interference with the POTS transmission frequency band 121 (FIG. 9). This also ensures that there is no significant interference to POTS-type attached equipment. It is possible for other services to be on the line in higher frequency bands 125.

The frequency band spectrum need not change when on/off-hook. That is, FIG. 10 can look like FIG. 9 without POTS transmission frequency band 121 being utilized. The spectrum can be baseband or passband with specific modulation examples being CAP, QAM, PAM, 2B1Q.

Illustrated in FIGS. 11A through 11D are examples of subscriber line communication that include several types of point-to-point applications that each benefit from different data rates and different transmission times in each direction of transmission. These same concepts can also be applied to those applications where multipoint DTU-Rs are deployed.

Figure 11A:
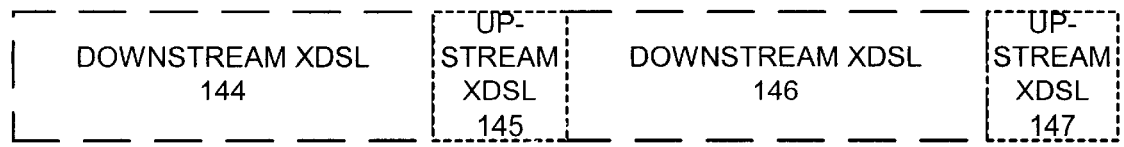
FIG. 11A is a block diagram of an example that represents a "downstream intensive" application for the data terminal units shown in FIGS. 6A and 6B, where all the transmission time is dedicated to downstream transmission, with the exception of necessary upstream error information as dictated by the link layer communication protocol.

FIG. 11A illustrates an example of a point-to-point application that is "downstream intensive." A downstream intensive application is utilized when there is a desire to move information as quickly as possible from the DTU-C 18 to the premises DTU-R 51. In the downstream intensive application, most if not all the transmission time is dedicated to the downstream transmission with the exception of any necessary upstream confirmation information. This upstream confirmation information as dictated by the link layer communication protocol. As shown in FIG. 11A, the downstream transmission of the DSL data 144 and 146 is interspersed with the upstream the DSL confirmation information 145 and 147.

Figure 11B:
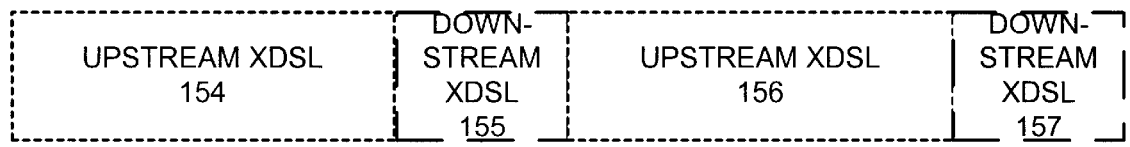
FIG. 11B is a block diagram of an example that represents an "upstream intensive" application for the data terminal units shown in FIGS. 6A and 6B, where all transmission time is dedicated to upstream transmission, with the exception of necessary downstream error information as dictated by the link layer communication protocol.

FIG. 11B illustrates an example of a point-to-point application that is "upstream intensive." An upstream intensive application is utilized when there is a desire to move information as quickly as possible from the premises DTU-R to the DTU-C. In an upstream intensive application, most if not all the transmission time is dedicated to the upstream transmission with the exception of the necessary downstream confirmation information. This downstream confirmation informnation as dictated by the link layer communication protocol. As shown in FIG. 11B, the upstream transmission of the DSL data 154 and 156 is interspersed with the downstream DSL confirmation information 155 and 157.

Figure 11C:
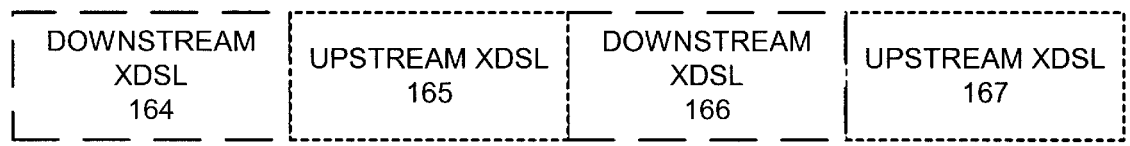
FIG. 11C is a block diagram of an example that represents a "symmetrical" application for the data terminal units shown in FIGS. 6A and 6B, where the transmission time is dedicated equally to downstream and upstream transmission, and where the error information is included in the upstream and downstream transmissions as dictated by the link layer communication protocol.

FIG. 11C illustrates an example of a point-to-point application that is "symmetrical" where the desire is to concurrently transfer as quickly as possible approximately equal amounts of information from the DTU-C 18 to the premises DTU-R 51 and from the premises DTU-R 51 to the DTU-C 18. In this case, the upstream confirmation information is included in the upstream transmission, and downstream confirmation information is included in the downstream transmission, both as dictated by the link layer communication protocol. As shown in FIG. 11C, the downstream DSL data 164 and 166 is approximately equal to the upstream DSL data 165 and 167.

Figure 11D:
FIG. 11D is a block diagram of an example that represents changing point-to-point application for the data terminal units shown in FIGS. 6A and 6B, where the application is initially "upstream intensive" and changes to "downstream intensive."

FIG. 11D illustrates an example of a variation of the above three point-to-point applications where the communication needs sequentially change in time from upstream intensive to downstream intensive as the upstream application is completed. As shown in FIG. 11D, the maximum upstream DSL data transmission 174 and 176 concludes, thereby allowing maximum downstream DSL data transmission 177 to occur. During the upstream intensive transmission, the downstream DSL data 175 includes confirmation information. Then during the downstream intensive transmission, the upstream DSL data transmission 178 includes confirmation information.

The amount of information communicated is the product of data rate and transmission time. For example, 1 megabit of information can be communicated in 10 seconds at 100 kbps or in 100 seconds at 10 kbps. Note that due to transmission impairments and limitations of the subscriber loop, it is not possible to have data rates arbitrarily high in both directions of transmission simultaneously. In fact, it is not possible to have a data rate arbitrarily high in either direction of transmission even when the other direction is silent. Practice and theory show that the subscriber loop will support some maximum data rate downstream ("maximum downstream data rate") and some other maximum data rate upstream ("maximum upstream data rate.")

Both the maximum downstream data rate and the maximum upstream data rate are truly achieved only when the transmission in the opposite direction is silent. Note also that even in downstream intensive and upstream intensive applications, it is not practical to use simplex transmission wherein transmission occurs only in one direction all the time. The reason is that some communication is required from time to time in the opposite direction to allow confirmation monitoring.

Thus, for some applications and some subscriber line conditions, it is beneficial to utilize half-duplex communication (where transmission in both directions never occurs simultaneously), and the data rates are restricted to the maximum downstream data rate and the maximum upstream data rate.

Thus, to optimize the various communications needs above, it is necessary to vary the transmission time in each direction of transmission according to the immediate and changing demands of the application or applications while utilizing the maximum downstream data rate and the maximum upstream data rate.

The non-symmetrical half-duplex data communications apparatus and method of the present invention also may utilize the mixed capability DTU-C 18 having at least one half-duplex signal inbound, and at least one full-duplex signal outbound as described in commonly assigned and co-pending U.S. Patent Application entitled "Echo Cancellation for Multipoint Networks," Ser. No. 08/994,867 filed on, Mar. 5, 1997, now U.S. Pat. No. 6,014,371 herein incorporated by reference.

In an alternative embodiment of the present invention, the non-symmetrical half-duplex data communications apparatus and method provide for automatic control of all communications on the subscriber line by the data terminal unit at the central office. This automatic control by the data terminal unit at the central office is accomplished in such a way, that the subscriber line data rate capacity is optimally utilized at all moments. This automatic control by the data terminal unit at the central office also avoids collisions between all data terminal units, and offers the selection of service priorities for data throughput between each user and the data terminal unit at the central office.

In another alternative embodiment of the present invention, the non-symmetrical half-duplex data communications apparatus and method provide for direct control of all data terminal unit subscriber line signals from the sensing of data transmission needs of the data protocols above the physical media dependent layer. The transmissions directives are thus derived from higher layer protocols without the need for non-data interfaces.

In alternative embodiment of the present invention, the non-symmetrical half-duplex data communications apparatus and method provides utilization of point-to-point full duplex data protocols, for example but not limited to, the Point to Point Protocol (PPP) defined in Internet Engineering Task Force (IETF) specification Request for Comment (RFC) 1661.

In still another alternative embodiment of the present invention, the non-symmetrical half-duplex data communications apparatus and method provides data transmission in the multi-point environment.

The embodiment or embodiments discussed herein were chosen and described to provide the best illustration of the principles of the invention and its practical application to thereby enable one of ordinary skill in the art to utilize the invention in various embodiments and with various modifications as are suited to the particular use contemplated. It is not intended to be exhaustive or to limit the invention to the precise forms disclosed. All such modifications and variations are within the scope of the invention as defined by the appended claims when interpreted in accordance with the breadth to which they are fairly and legally entitled.

What is claimed is:

1. A method for communicating data from a data terminal unit (DTU), the method comprising:

receiving a poll from a central office DTU, the poll comprising at least an address header;

determining if the address header identifies the DTU;

determining if a variable length frame communicated from a digital type device resides in a buffer when the address header identifies the DTU;

encapsulating the variable length frame between a second address header and a frame check sequence when the variable length frame resides in the buffer, wherein the second address header identifies at least a destination device; and communicating the encapsulated variable length frame onto a digital subscriber line, wherein length of the encapsulated variable length frame is determined by length of the variable length frame received from the digital type device.

2. The method of claim 1, wherein the communicating further comprises communicating the encapsulated variable length frame to the central office DTU.

3. The method of claim 1, wherein the communicating further comprises communicating the encapsulated variable length frame to a second DTU, the second DTU residing on the subscriber line and identified by the second address header.

4. The method of claim 1, further comprising communicating a response when the address header identifies the DTU, the response comprising at least the encapsulated variable length frame.

5. The method of claim 1, further comprising communicating a response when the address header identifies the DTU and when no variable length frame resides in the buffer, the response comprising a third address header and the frame check sequence.

6. The method of claim 1, further comprising communicating a response when the address header identifies the DTU and when no variable length frame resides in the buffer, wherein the response is silence from the DTU.

7. The method of claim 1, further comprising:

starting a response when the address header identifies the DTU, a response start indicated by turning on a carrier; and ending the response, a response end indicated by turning off the carrier.

8. The method of claim 1, further comprising;

converting serial data streams received from the DTU into parallel data; and storing the parallel data in a buffer, the parallel data corresponding to the variable length frame.

9. The method of claim 8, wherein encapsulating further comprises encapsulating the parallel data between the second address header and the frame check sequence.

10. The method of claim 1, further comprising:

communicating a telephone signal over a first frequency range; and communicating the encapsulated variable length frame over a second frequency range, the second frequency range different from the first frequency range.

11. The method of claim 10, further comprising communicating another signal over a third frequency range, the third frequency range different from the first frequency range and the second frequency range.

12. A central office data terminal unit (DTU) comprising:
an interface coupled to a communication system;
at least one buffer coupled to the interface and configured to receive a variable length frame from a remote digital type device, the variable length frame having an amount of data to be communicated to a remote DTU residing on a subscriber loop coupled to the central office DTU; and
a modulator/demodulator coupled to the subscriber line and the buffer, and configured to communicate a poll to the remote DTU, wherein length of the poll is determined by the amount of the data residing in the variable length frame, and wherein the modulator/demodulator is further configured to receive a response from the remote DTU, the response comprising at least a second variable length frame generated by a digital type device coupled to the remote DTU, and wherein length of the response is determined by a second amount of data residing in the second variable length frame.

13. The central office DTU of claim 12, further comprising:
a plurality of interfaces coupled to the communication system; and
a plurality of buffers, each of the plurality of buffers uniquely coupled to one of the plurality of interfaces and configured to receive a third variable length frame from one of a plurality of remote digital type devices, the third variable length frame having data to be communicated to the remote DTU, and wherein length of the third variable length frame is determined by a third amount of data residing in the third variable length frame.

14. The central office DTU of claim 12, wherein the modulator/demodulator is configured to encapsulate the variable length frame between an address header and a frame check sequence when the variable length frame resides in the buffer, wherein the address header identifies the remote DTU.

15. The central office DTU of claim 14, wherein the address header uniquely identifies the remote DTU from a plurality of DTUs coupled to the subscriber line.

16. A system for communicating data from a data terminal unit (DTU), comprising:
means for receiving a poll from a central office DTU, the poll comprising at least an address header;
means for determining if the address header identifies the DTU;
means for determining if a variable length frame communicated from a digital type device resides in a buffer when the address header identifies the DTU;
means for encapsulating the variable length frame between a second address header and a frame check sequence when the variable length frame resides in the buffer, wherein the second address header identifies at least a destination device; and
means for communicating the encapsulated variable length frame onto a digital subscriber line, wherein length of the encapsulated variable length frame is determined by length of the variable length frame received from the digital type device.

17. The system of claim 16, wherein the means for communicating further comprises means for communicating the encapsulated variable length frame to the central office DTU.

18. The system of claim 16, wherein the means for communicating further comprises means for communicating the encapsulated variable length frame to a second DTU, the second DTU residing on the subscriber line and identified by the second address header.

19. The system of claim 16, further comprising means for communicating a response when the address header identifies the DTU, the response comprising at least the encapsulated variable length frame.

20. The system of claim 16, further comprising means for communicating a response when the address header identifies the DTU and when no variable length frame resides in the buffer, the response comprising only a third address header and the frame check sequence.

21. The system of claim 16, further comprising means for communicating a response when the address header identifies the DTU and when no variable length frame resides in the buffer, wherein the response is silence from the DTU.

22. The system of claim 16, further comprising:
means for turning on a carrier to indicate a start of a response, wherein the response comprises the encapsulated variable length frame; and
means for turning off the carrier to indicate an end of the response.

23. The system of claim 16, further comprising:
means for converting serial data streams received from the DTU into parallel data; and
means for storing the parallel data in a buffer, the parallel data corresponding to the variable length frame.

24. The system of claim 23, wherein the means for encapsulating further comprises means for encapsulating the parallel data between the second address header and the frame check sequence.

25. The system of claim 16, further comprising:
means for communicating a telephone signal over a first frequency range; and
means for communicating the encapsulated variable length frame over a second frequency range, the second frequency range different from the first frequency range.

26. A system for communicating data from a central office data terminal unit (DTU), comprising:
means for communicating a poll from the central office DTU onto a subscriber line, the poll comprising a first variable length frame having at least an address header identifying a remote DTU coupled to the subscriber line, and wherein length of the first variable length frame is determined by a first amount of data; and
means for receiving a response from the remote DTU, the response comprising a second variable length frame, the second variable length frame generated by a digital type device coupled to the remote DTU, and wherein length of the response is determined by a second amount of data residing in the second variable length frame.

27. The system of claim 26, further comprising:
means for encapsulating the second variable length frame and a second address header identifying a destination device into a frame, the second address header specified in the received response; and
means for communicating the frame onto a communication system coupled to the central office DTU, wherein length of the frame is determined by the second amount of data residing in the second variable length frame.

28. The system of claim 26, wherein the means for communicating further comprises means for communicating the encapsulated variable length frame from the central office DTU onto a communication system.

29. The system of claim 26, further comprising:
means for detecting a start of the response when the remote DTU turns on a carrier; and
means for detecting an end of the response when the remote DTU turns off the carrier.

30. The system of claim 26, further comprising:
means for communicating a telephone signal onto the subscriber line over a first frequency range; and
means for communicating the poll onto the subscriber line over a second frequency range, the second frequency range different from the first frequency range.

* * * * *